(12) United States Patent
Shin et al.

(10) Patent No.: US 11,501,576 B2
(45) Date of Patent: Nov. 15, 2022

(54) WEARABLE DEVICE, VIRTUAL CONTENT PROVIDING DEVICE, AND VIRTUAL CONTENT PROVIDING METHOD

(71) Applicant: ELECTRONICS AND TELECOMMUNICATIONS RESEARCH INSTITUTE, Daejeon (KR)

(72) Inventors: Hee Sook Shin, Daejeon (KR); Sung Jin Hong, Incheon (KR); Youn Hee Gil, Daejeon (KR); Hee Kwon Kim, Daejeon (KR); Seong Min Baek, Daejeon (KR); Cho Rong Yu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 156 days.

(21) Appl. No.: 16/952,436

(22) Filed: Nov. 19, 2020

(65) Prior Publication Data
US 2021/0374392 A1    Dec. 2, 2021

(30) Foreign Application Priority Data
Jun. 1, 2020   (KR) .................. 10-2020-0066085

(51) Int. Cl.
 *G06V 40/20*   (2022.01)
 *G06F 3/01*   (2006.01)
 (Continued)

(52) U.S. Cl.
 CPC ............. *G06V 40/23* (2022.01); *G06F 1/163* (2013.01); *G06F 3/011* (2013.01); *G06K 9/6256* (2013.01)

(58) Field of Classification Search
 CPC ........ G06V 40/23; G06V 20/20; G06V 40/15; G06F 1/163; G06F 3/011; G06F 3/013;
 (Continued)

(56) References Cited

U.S. PATENT DOCUMENTS

| 2002/0128540 A1* | 9/2002 | Kim ................. G16H 15/00 702/19 |
| 2012/0122062 A1 | 5/2012 | Yang et al. |

(Continued)

FOREIGN PATENT DOCUMENTS

| KR | 10-1584314 B | 1/2016 |
| KR | 10-2018-0028033 A | 3/2018 |
| KR | 10-2016676 B | 8/2019 |

OTHER PUBLICATIONS

Sun Min Lee, "The Development of Social Orientation Training Program for Development Disability Children Based on HMD and Motion Recognition", Hongik University, Master's Thesis, Jan. 2016.

*Primary Examiner* — Quan Zhen Wang
*Assistant Examiner* — Mancil Littlejohn, Jr.
(74) *Attorney, Agent, or Firm* — LRK Patent Law Firm (57) ABSTRACT

A virtual content providing device includes: a communication circuit capable of communicating with a wearable device worn by a user; and a processor functionally connected to the communication circuit. The processor is configured to: display virtual training content on the wearable device through the communication circuit; generate training situation information and user condition information associated with the virtual training content through the wearable device; determine a intervention time point for the virtual training content based on the training situation information and the user condition information; generate virtual intervention content associated with the intervention time point;
(Continued)

and display the virtual intervention content in synchronization with the virtual training content through the wearable device.

18 Claims, 4 Drawing Sheets

(51) Int. Cl.
*G06K 9/62* (2022.01)
*G06F 1/16* (2006.01)

(58) Field of Classification Search
CPC ...... G06K 9/6256; G06Q 50/10; G06Q 50/20; G09B 9/00
See application file for complete search history.

(56) References Cited

U.S. PATENT DOCUMENTS

| | | | |
|---|---|---|---|
| 2015/0382071 A1* | 12/2015 | Aravamudan | H04N 21/812 725/14 |
| 2016/0042656 A1 | 2/2016 | Lee et al. | |
| 2017/0162072 A1* | 6/2017 | Horseman | A61B 5/6803 |
| 2019/0033914 A1* | 1/2019 | Aimone | A61B 5/378 |

* cited by examiner

WEARABLE DEVICE, VIRTUAL CONTENT PROVIDING DEVICE, AND VIRTUAL CONTENT PROVIDING METHOD

CROSS-REFERENCE TO RELATED APPLICATION

This application claims priority to and the benefit of Korean Patent Application No. 10-2020-0066085, filed on Jun. 1, 2020, the disclosure of which is incorporated herein by reference in its entirety.

BACKGROUND

1. Field of the Invention

Various embodiments disclosed herein relate to a virtual content providing technology.

2. Description of Related Art

As the number of developmentally disabled people increases by 3.6% per year on average, social costs also are expected to increase every year. Accordingly, in order to reduce the social burden on developmentally disabled people and induce developmentally disabled people to participate in society, it is necessary to create an active self-reliance environment for developmentally disabled people.

The government is promoting job and employment capability improvement through career education and vocational experience training for developmentally disabled people in transition period through "Comprehensive Measures by Life Cycle of Developmentally Disabled People" (Sep. 12, 2018). By the way, the conventional career education and vocational experience training are offline education through training centers for developmentally disabled people or dedicated training centers, which are installed nationwide, and have been provided while being limited to some jobs and occupations.

Virtual vocational training content that has been being distributed in recent years may overcome the temporal and spatial constraints of career education and vocational experience training and may diversify trainable jobs and occupations.

SUMMARY

However, since the conventional virtual vocational training content is developed and serviced for non-disabled people, it may be difficult for developmentally disabled people with low cognitive ability to train and learn. For developmentally disabled people, vocational training may be carried out in real environments (special education and actual training centers) under the intervention of the professor according to the judgment of the instructor on the subject of training. Therefore, such intervention may be required even in virtual vocational training.

Various embodiments disclosed herein may provide a wearable device, a virtual content providing device, and a virtual content providing method, which are capable of providing virtual intervention content in synchronization with virtual training content.

A virtual content providing device according to an embodiment may include: a communication circuit capable of communicating with a wearable device worn by a user; and a processor functionally connected to the communication circuit, wherein the processor is configured to: display virtual training content on the wearable device through the communication circuit; generate training situation information and user condition information associated with the virtual training content through the wearable device; determine a intervention time point for the virtual training content based on the training situation information and the user condition information; generate virtual intervention content associated with the intervention time point; and display the virtual intervention content in synchronization with the virtual training content through the wearable device.

A wearable device according to an embodiment may include: a display; an input circuit configured to sense or receive a user input; a sensor circuit configured to obtain biometric information of a user; a communication circuit capable of communicating with a virtual content providing device; and a processor functionally connected to the display, the sensor circuit, and the communication circuit, wherein the processor is configured to: obtain virtual training content from the virtual content providing device through the communication circuit; display the obtained virtual training content through the display; while displaying the virtual training content, generate user condition information associated with the virtual training content based on the biometric information and generate user input information associated with the user input; transmit the user condition information and the user input information to the virtual content providing device; and as the virtual content providing device provides virtual intervention content at a intervention time point determined based on the user condition information and the user input information, display the virtual intervention content in synchronization with the virtual training content through the display.

In addition, a virtual content providing method according to an embodiment may include: displaying virtual training content through a wearable device; generating training situation information and user condition information associated with the virtual training content through the wearable device; determining a intervention time point for the virtual training content based on the training situation information and the user condition information; generating virtual intervention content associated with the determined intervention time point; and displaying the virtual intervention content in synchronization with the virtual training content through the wearable device.

According to various embodiments disclosed herein, virtual intervention content may be provided in synchronization with virtual training content. In addition to this, various effects that are directly or indirectly identified through this disclosure may be provided.

BRIEF DESCRIPTION OF THE DRAWINGS

In connection with the description of the drawings, the same or similar reference numerals may be used to refer to the same or similar components.

DETAILED DESCRIPTION

Figure 1:
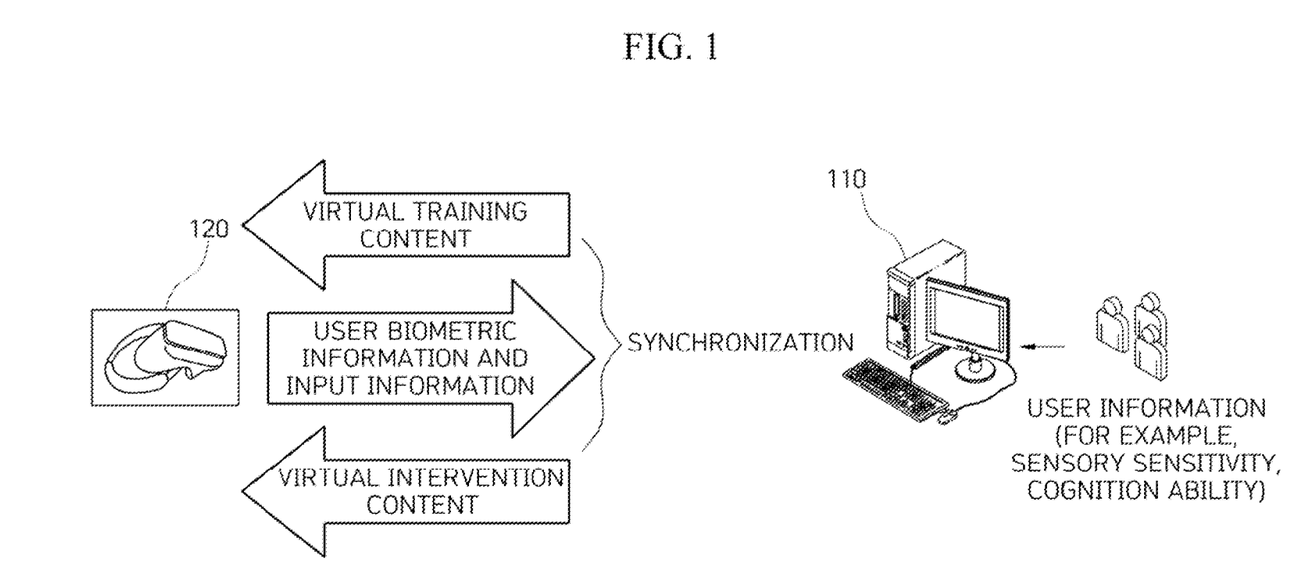
FIG. 1 illustrates a virtual content providing system according to an embodiment.

FIG. 1 illustrates a virtual content providing system according to an embodiment.

Referring to FIG. 1, a virtual content providing system 10 according to an embodiment may include a wearable device 110 and a virtual content providing device 120.

According to an embodiment, the wearable device 110 may be at least one wearable device that is worn by a user (trainee). For example, the wearable device 110 may include at least one of a head mount display (HMD) and a smart watch. The user may include a user having lower cognitive ability than that of an ordinary person, such as developmentally disabled people or children. Alternatively, the user may include the ordinary person.

The wearable device 110 may receive virtual content from the virtual content providing device 120 and display the received virtual content through a 3D display. The virtual content may include virtual training content, and in some cases, may further include virtual intervention content. The wearable device 110 may generate a user's biometric information and input information while displaying the virtual training content, and may transmit the biometric information and the user input information to the virtual content providing device 120.

According to an embodiment, the virtual content providing device 120 may be at least one computing device that provides virtual content. For example, the virtual content providing device 120 may include a web server that provides virtual content and a smart phone that receives the virtual content from the web server and transmits the received virtual content to the wearable device 110.

The virtual content providing device 120 may display virtual training content corresponding to the user through the wearable device 110, and may generate training situation information and user condition information based on the biometric information and the user input information.

The virtual content providing device 120 may determine a intervention time point for the virtual training content based on the training situation information and the user condition information. For example, the virtual content providing device 120 may check the training efficiency of the user based on the training situation information and the user condition information, and may determine the intervention time point to correspond to the training efficiency. For another example, the virtual content providing device 120 may check the type of intervention capable of increasing the training efficiency of the user based on the training situation information and the user condition information, and may determine a intervention time point of the checked type of intervention.

The virtual content providing device 120 may generate virtual intervention content associated with the determined intervention time point, and may display the generated virtual intervention content in synchronization with the virtual training content through the wearable device 110. The virtual intervention content may include, for example, at least one intervention of break, promotion, cue, checkup, and modeling, and the at least one intervention may be provided as at least one resource of a visual sense, an auditory sense, or a tactile sense.

According to the above-described embodiment, the virtual content providing system 10 may monitor training situation and condition information of a user who performs virtual training, and may provide virtual intervention content that helps the training of the user using the virtual training content, based on a result of the monitoring.

Figure 2:
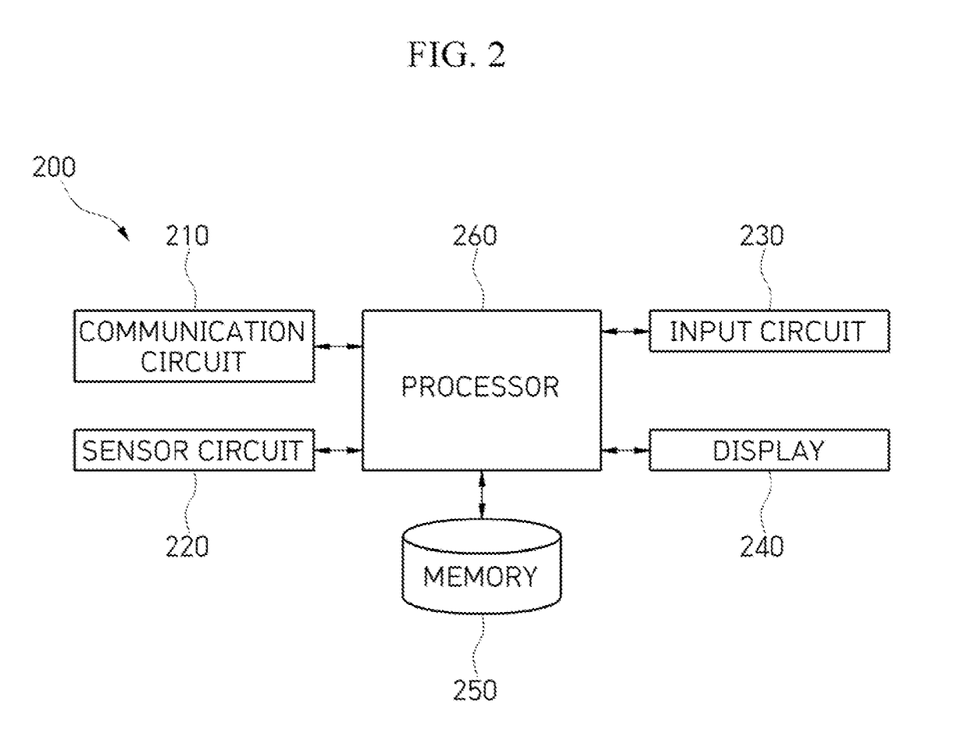
FIG. 2 illustrates a wearable device according to an embodiment.

FIG. 2 illustrates a wearable device according to an embodiment.

Referring to FIG. 2, a wearable device 200 (for example, the wearable device 110 of FIG. 1) according to an embodiment may include a communication circuit 210, a sensor circuit 220, an input circuit 230, a display 240, a memory 250, and a processor 260. In an embodiment, the wearable device 200 may omit some components or may further include additional components. In addition, some components of the wearable device 200 may be combined to constitute a single entity and may perform the functions of the components before the combination in the same manner. Alternatively, the wearable device 200 may include a smart watch and an HMD.

The communication circuit 210 may establish a communication channel or a wireless communication channel between the wearable device 200 and another device (for example, the virtual content providing device 120), and may support performing communication through the established communication channel. The communication channel may be, for example, a short-range wireless communication channel such as Bluetooth, WiFi, or Wibro. The communication channel may be, for example, a wired communication channel such as USB or HDMI.

The sensor circuit 220 may detect biometric information such as a user's heart rate and body temperature. The sensor circuit 220 may further include a motion sensor capable of detecting a user's motion.

The input circuit 230 may detect or receive a user input. For example, the input circuit 230 may include at least one of a button operable by the user and a camera capable of capturing a user's gaze.

The display 240 may include, for example, a liquid crystal display (LCD), a light-emitting diode (LED) display, or an organic light-emitting diode (OLED) display. According to an embodiment, the display 240 may be provided to display 3D virtual training content. For example, the display 240 may include a left display provided to be identifiable through a user's left eye and a right display provided to be identifiable through a user's right eye. The left display and the right display may display 3D virtual training content by displaying left-eye virtual training content and right-eye virtual training content having a parallax according to a command of the processor 260.

The memory 250 may store various data used by at least one component (for example, the processor 260) of the wearable device 200. The data may include, for example, software and input data or output data for commands associated therewith. For example, the memory 250 may store at least one instruction for providing virtual content. The memory 250 may include a volatile memory or a non-volatile memory.

As the processor 260 executes at least one instruction, the processor 260 may control at least one other component (for example, hardware or software component) of the wearable device 200, and may perform a variety of data processing or operations. The processor 260 may include, for example, at least one of a central processing unit (CPU), a graphic processing unit (GPU), a microprocessor, an application processor, an application specific integrated circuit (ASIC), and field programmable gate arrays (FPGA), and may include a plurality of cores.

According to an embodiment, the processor 260 may obtain virtual training content from the virtual content providing device 120 through the communication circuit 210, and may display the obtained virtual training content through the display 240.

According to an embodiment, the processor 260 may generate the user condition information and the user input information through the sensor circuit 220 and the input circuit 230 while displaying the virtual training content. For example, the processor 260 may obtain the biometric information (including motion information) of the user through the sensor circuit 220, and may generate user condition information associated with the virtual training content based on the biometric information. The user condition information may include, for example, condition information of at least one of a response degree, fatigue degree, emotion, posture, and movement of the user. For another example, the processor 260 may generate user input information associated with a user input sensed or received through the input circuit 230. The user input information may include, for example, at least one of information about gaze coordinates of the user and information about an operated button. The processor 260 may transmit the user condition information and the user input information to the virtual content providing device 120.

According to an embodiment, the processor 260 may obtain the virtual intervention content associated with the intervention time point from the virtual content providing device 120 through the communication circuit 210. The processor 260 may display the virtual intervention content through the display 240 in synchronization with the virtual training content. In this regard, the virtual content providing device 120 may receive the user condition information and the user input information, may determine a intervention time point capable of increasing training efficiency based on the received user condition information and user input information, and may generate and provide virtual intervention content associated with the intervention time point capable of increasing training efficiency.

According to various embodiments, at least one configuration of the wearable device 200 may be performed by the virtual content providing device 120. For example, when the wearable device 200 transmits the biometric information and the user input information of the user to the virtual content providing device 120, the virtual content providing device 120 may obtain the user condition information based on the biometric information and the user input information.

According to the above-described embodiment, since the wearable device 200 transmits, to the virtual content providing device 120, the user condition information and the user input information which are the basis for determining user training efficiency when providing the virtual training content, the virtual content providing device 120 may check the training efficiency of the virtual training content based on the user condition information and the user input information, and may support providing the virtual intervention content so as to increase the training efficiency.

Figure 3:
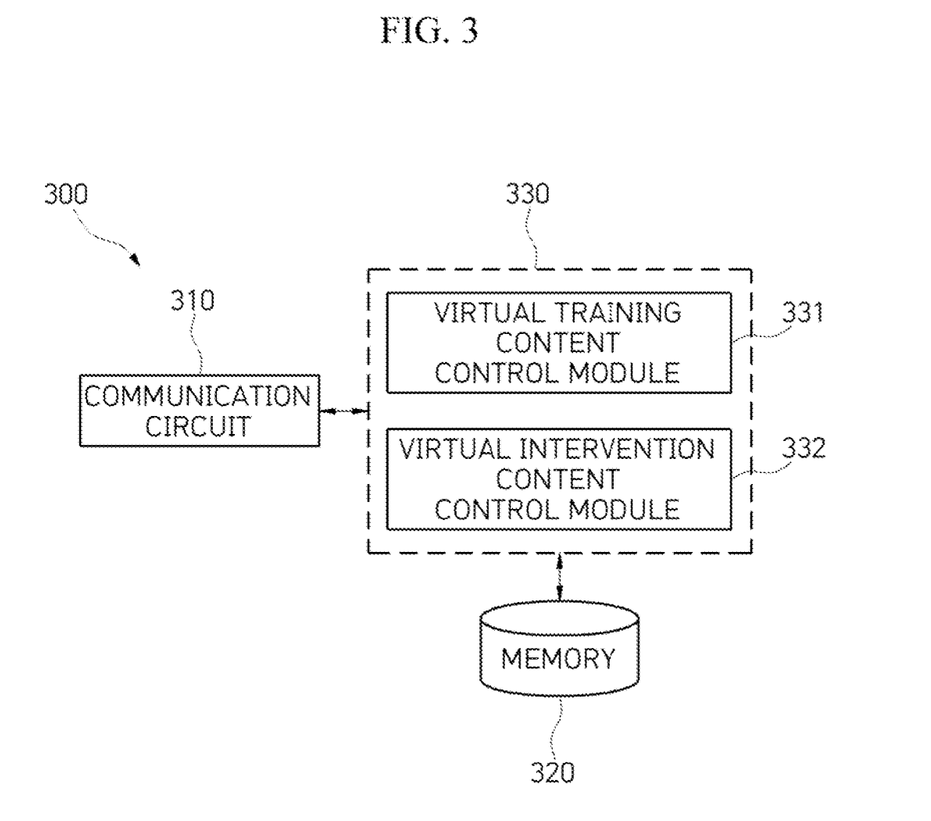
FIG. 3 illustrates a virtual content providing device according to an embodiment.

FIG. 3 illustrates a virtual content providing device according to an embodiment.

Referring to FIG. 3, a virtual content providing device 300 (for example, the virtual content providing device 120 of FIG. 1) according to an embodiment may include a communication circuit 310, a memory 320, and a processor 330. In an embodiment, the virtual content providing device 300 may omit some components or may further include additional components. In addition, some components of the virtual content providing device 300 may be combined to constitute a single entity and may perform the functions of the components before the combination in the same manner. For example, the virtual content providing device 300 may include a web server that provides virtual content and a smart phone that receives the virtual content from the web server and transmits the received virtual content to the wearable device 200.

The communication circuit 310 may establish a communication channel or a wireless communication channel between the virtual content providing device 300 and another device (for example, the wearable device 200), and may support performing communication through the established communication channel. The communication channel may be, for example, a short-range wireless communication channel such as Bluetooth, WiFi, or Wibro.

The memory 320 may include a volatile memory or a non-volatile memory. The memory 320 may store various data used by at least one component (for example, the processor 330) of the virtual content providing device 300. The data may include, for example, software and input data or output data for commands associated therewith. For example, the memory 320 may store at least one instruction for providing virtual training and intervention content. For another example, the memory 320 may store user information and virtual training content. The user information may include, for example, at least one piece of capability information of sensory sensitivity and cognitive ability for each user. The at least one piece of capability information, for example, may be measured for each user at the time of production or before reproduction of virtual training content or virtual intervention content. The virtual training content may be, for example, 3D content associated with at least one of career education and job/vocational training. The virtual intervention content may include, for example, at least one intervention of break, promotion, cue, checkup, and modeling. The clue intervention may be, for example, a intervention that provides a hint associated with training when training efficiency is low. The promotion intervention may be, for example, a intervention that provides promotion or praise for a training situation when training efficiency is high. The checkup intervention may be, for example, a intervention that provides a test for training content. The modeling intervention may be a intervention that expects to acquire a skill through a user's behavior imitation. The at least one intervention may be provided as at least one of a visual resource of at least one of pictures, texts, objects, reconstruction of environment, and marks, an auditory resource through sound output, or a tactile resource such as vibration.

As the processor 330 executes at least one instruction, the processor 330 may control at least one other component (for example, hardware or software component) of the virtual content providing device 300, and may perform a variety of data processing or operations. The processor 330 may include, for example, at least one of a CPU, a GPU, a microprocessor, an application processor, an ASIC, and an FPGA, and may include a plurality of cores. The processor 330 may include a virtual training content control module 331 associated with reproduction of the virtual training content and a virtual intervention content control module 332 associated with reproduction of the virtual intervention content. In this disclosure, for convenience of explanation, the processor 330 is described as a subject without distinguishing between the virtual training content control module 331 and the virtual intervention content control module 332.

According to an embodiment, the processor 330 may be communicatively connected with the wearable device 200 through the communication circuit 310, and may obtain a reproduction request for the user's virtual training content through the wearable device 200. Since the processor 330 transmits, to the wearable device 200, the virtual training content requested for reproduction by the wearable device 200, the processor 330 may display the virtual training content through the wearable device 200.

According to an embodiment, while providing the virtual training content through the wearable device 200, the processor 330 may generate training situation information associated with the virtual training content and user condition information based on at least one of biometric information and input information. The training situation information may include, for example, training result information such as training success (for example, completion of training within a specified time), training failure (for example, non-completion of training within a specified time), successes/failure count, or training score, and Information about the timing of training in virtual training content. The user condition information may include at least one condition of a response degree, a fatigue degree, an emotion, a posture, and a movement of the user. For example, the processor 330 may obtain the biometric information of the user through the wearable device 200, and may generate user condition information including at least one of the response degree, the fatigue degree, the emotion, the posture, and the movement of the user based on the obtained biometric information. For another example, the processor 330 may generate training result information including at least one of training success, training failure, success/failure count, and training score based on the input information and biometric information of the user.

According to an embodiment, the processor 330 may determine a intervention time point (or a reproduction time point of the virtual intervention content) for the virtual training content based on the training situation information and the user condition information. For example, when the response degree of the user is less than a threshold response degree based on the user condition information, the processor 330 may determine a corresponding time point as a promotion time point to promote the training of the user. For another example, when the fatigue degree of the user is greater than or equal to a threshold fatigue degree or when the emotional condition is bad, the processor 330 may determine a corresponding time point as a intervention time to induce break. For another example, when a difference between a reference posture required for training and a posture of a user and a difference between a reference movement required for training and a movement of a user are respectively greater than or equal to a first threshold difference and a second threshold difference based on the user condition information, the processor 330 may determine a corresponding time point as a modeling intervention time point. For another example, the processor 330 may determine a time point when training is successful as a promotion intervention time point to provide praise, and may determine a time point when training fails as a clue intervention time point or modeling intervention time point. For another example, when training is completed, the processor 330 may determine a corresponding time point as a checkup intervention time point. For another example, the processor 330 may check the training efficiency of the user for the virtual training content based on the training situation information and the user condition information, and determine the intervention time point so that the frequency of intervention increases as the training efficiency decreases. For example, when the failure count is greater than or equal to a first threshold count, when the training score is less than a threshold score, or when the difference between the reference posture and the posture of the user is greater than or equal to the first threshold difference and the difference between the reference movement and the movement of the user is greater than or equal to the second threshold difference, the processor 330 may determine that the training efficiency is low and may increase the frequency of intervention.

According to an embodiment, the processor 330 may generate virtual intervention content associated with each of the determined intervention time points. For example, when the clue intervention and checkup training efficiency are less than the threshold efficiency, the processor 330 may generate virtual intervention content including at least one intervention of the clue for inducing the acquisition of skill for virtual training content, the checkup for diagnosing the training degree of the virtual training content, or the modeling providing information obtained by imitating the behavior of the user. For another example, when the training efficiency is greater than or equal to the threshold efficiency, the processor 330 may generate the virtual intervention content including the promotion intervention to praise the user. For another example, when the response degree of the user is less than the threshold response degree based on personal condition information, the processor 330 may generate virtual intervention content including promotion intervention to promote skill acquisition (or training). For another example, when the fatigue degree or emotional state of the user is bad, the processor 330 may generate virtual intervention content to give a break time. For another example, the processor 330 may generate virtual intervention content including modeling intervention based on the posture or movement information of the user. For another example, when completion of training is confirmed based on training situation information, the processor 330 may generate virtual intervention content including checkup intervention.

According to an embodiment, when the intervention time point is determined, the processor 330 may obtain, from the memory 320, at least one piece of capability information of sensory sensitivity and cognitive capability associated with the user, and may generate virtual intervention content so as to increase training efficiency based on the obtained at least one piece of capability information. For example, the processor 330 may generate virtual intervention content to stimulate at least one sense having relatively high training efficiency of the user among a plurality of senses including a visual sense, an auditory sense, and a tactile sense based on the at least one piece of capability information. For another example, the processor 330 may generate virtual intervention content by changing the degrees of acquisition of stimulation and attention based on the at least one piece of capability information. The processor 330 may increase the degrees of acquisition of stimulation and attention (or the degree of intervention) as the user's sensory sensitivity and cognitive ability decrease. In contrast, when there is no capability information of the user stored in the memory 320, the processor 330 may generate virtual intervention content corresponding to the capability information of the general user (the general person).

According to an embodiment, the processor 330 may check the number of times of reproductions of the virtual training content by the user from the memory 320, and as the number of times of reproductions increases, may generate virtual intervention content having a relatively low degree of intervention with respect to the virtual training content.

According to an embodiment, the processor 330 may display the virtual intervention content in synchronization with the virtual training content through the wearable device 200. For example, the processor 330 may display virtual intervention content associated with the determined intervention time point in synchronization with the reproduction time point of the virtual intervention content corresponding to the determined intervention time point.

According to the above-described embodiment, since the virtual content providing device 300 provides virtual intervention content including at least one resource selected from visual, auditory, and tactile resources, it is possible to promote a change in outward behavior, such as correcting the problem behavior of user who has difficulty in learning or training through virtual training content, or fostering positive behavior. Therefore, it is possible to increase the user's education and training efficiency.

In addition, according to the above-described embodiment, the virtual content providing device 300 may overcome temporal and spatial constraints on the training of the user and constraints on human resources by providing virtual intervention similar to intervention in a real world training environment through the virtual intervention contents.

In addition, according to the above-described embodiment, the virtual content providing device 300 may change the degree of stimulation and attention according to the sensory sensitivity and cognitive ability of the user (trainee), and may provide customized intervention suitable for the user's training situation and user condition.

Furthermore, according to the above-described embodiment, the virtual content providing device 300 may provide virtual intervention content so that the virtual training content may be gradually adapted to the actual job environment by decreasing the degree of intervention intervention as the number of times of reproductions of the virtual training content.

Figure 4:
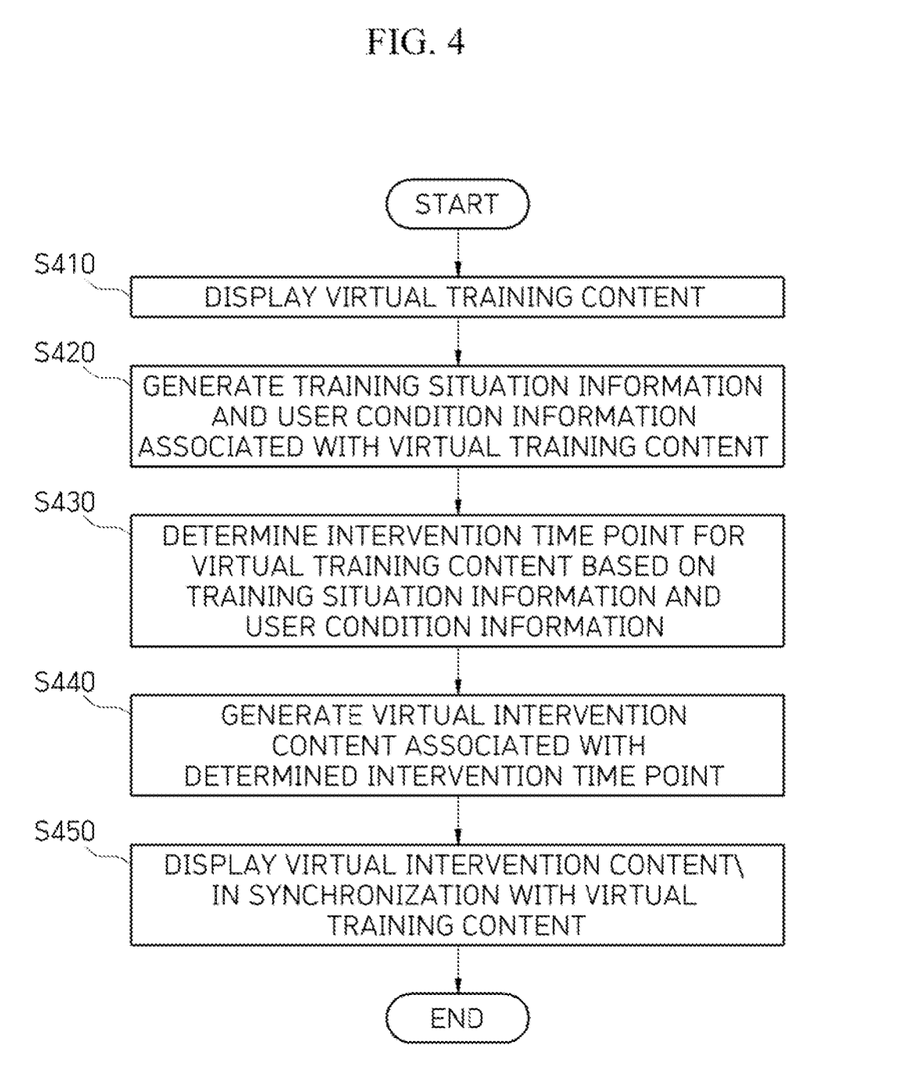
FIG. 4 illustrates a virtual content providing method according to an embodiment.

FIG. 4 illustrates a virtual content providing method according to an embodiment.

Referring to FIG. 4, in operation 410, the virtual content providing device 300 may display virtual training content through the wearable device 200.

In operation 420, the virtual content providing device 300 may generate user condition information and training situation information association with the virtual training content through the wearable device 200.

In operation 430, the virtual content providing device 300 may determine a intervention time point for the virtual training content based on the user condition information and the training situation information.

In operation 440, the virtual content providing device 300 may generate virtual intervention content associated with the determined intervention time point.

In operation 450, the virtual content providing device 300 may display the virtual intervention content in synchronization with the virtual training content through the wearable device 200.

Various embodiments of this disclosure and terms used therein are not intended to limit the technical features described in this disclosure to specific embodiments, and should be understood to include various modifications, equivalents, or substitutes of the corresponding embodiments. In connection with the description of the drawings, similar reference numerals may be used to refer to similar or related components. The singular form of a noun corresponding to an item may include one or more items unless clearly indicated otherwise in the related context. In this document, each of the phrases such as "A or B," "at least one of A and B," "at least one of A or B," "A, B, or C," "at least one of A, B, and C," and "at least one of A, B, or C" may include any one of the items listed together in the corresponding one of the phrases or all possible combinations thereof. The terms such as "first," "second," etc. may be used simply to distinguish one component from another and do not limit the components in other aspects (for example, importance or order). When a certain component (for example, a first component) is referred to as being "coupled" or "connected" to another component (for example, a second component) with or without the term "functionally" or "communicatively," it means that the component may be connected to the other component directly (for example, by wire), wirelessly, or via a third component.

The terms "module," "unit," and "means" used in this disclosure may include units implemented as hardware, software, or firmware, and may be used interchangeably with the terms such as logics, logic blocks, parts, or circuits. The module may be an integrally configured component or may be a minimum unit of the component that performs one or more functions or a part thereof. For example, according to an embodiment, the module may be implemented in the form of an application-specific integrated circuit (ASIC).

Various embodiments of this disclosure may be implemented as software (for example, a program) storing one or more instructions stored in a storage medium (for example, internal memory or external memory) (the memory 320) that is readable by a machine (for example, the virtual content providing device 300). For example, a processor (for example, the processor 330) of the machine (for example, the virtual content providing device 300) may call at least one of the stored one or more instructions from the storage medium and execute the called at least one instruction. This makes it possible for the machine to be operated to perform at least one function according to the called at least one instruction. The one or more instructions may include code generated by a compiler or code executable by an interpreter. The storage medium that is readable by the machine may be provided in the form of a non-transitory storage medium. "Non-transitory" only means that the storage medium is a tangible device and does not include signals (for example, electromagnetic waves). This term does not distinguish between a case in which data is stored semi-permanently in the storage medium and a case in which data is stored temporarily in the storage medium.

According to an embodiment, the methods according to various embodiments described in this disclosure may be provided while being included in computer program products. The computer program products may be traded between sellers and buyers as commodities. The computer program products may be distributed in the form of a device-readable storage medium (for example, compact disc read only memory (CD-ROM)), or may be distributed (for example, downloaded or uploaded) through an application store (for example, Play Store™) or directly or online between two user devices (for example, smart phones). In the case of online distribution, at least a portion of the computer program product may be temporarily stored or temporarily generated in a machine-readable storage medium such as a server of a manufacturer, a server of an application store, or a memory of a relay server.

According to various embodiments, each component (for example, a module or a program) of the above-described components may include one or more entities. According to various embodiments, one or more of the above-described corresponding components or operations may be omitted, or one or more other components or operations may be added. Alternatively or additionally, a plurality of components (for example, modules or programs) may be integrated into one component. In this case, the integrated component may perform one or more functions of each of the plurality of components in the same manner as or in the similar manner to that performed by the corresponding component among the plurality of components prior to the integration. According to various embodiments, operations performed by the modules, programs, or other components may be performed sequentially, in parallel, repeatedly, or heuristically, one or more of the operations may be performed in different orders or may be omitted, or one or more other operations may be added.

What is claimed is:

1. A virtual content providing device comprising:
a communication circuit capable of communicating with a wearable device worn by a user; and
a processor functionally connected to the communication circuit, wherein the processor is configured to:
display virtual training content on the wearable device through the communication circuit;
obtain biometric information of the user through the wearable device;
generate training situation information and user condition information associated with the virtual training content through the wearable device, wherein the user condition information comprises a response degree, a fatigue degree, an emotion, a posture, and a movement of the user based on the biometric information;
determine an intervention time point for the virtual training content based on the training situation information and the user condition information;
generate virtual intervention content associated with the intervention time point; and
display the virtual intervention content in synchronization with the virtual training content through the wearable device.

2. The virtual content providing device of claim 1, wherein the training situation information includes at least one of training result information including training success, training failure, or training score and user input information including gaze coordinates of the user.

3. The virtual content providing device of claim 1, wherein the processor is further configured to:
check training efficiency of the user for the virtual training content based on the training situation information and the user condition information; and
determine the intervention time point so that a frequency of intervention increases as the training efficiency decreases.

4. The virtual content providing device of claim 1, wherein the processor is further configured to:
when an emotion state of the user is bad, based on the user condition information, determine a corresponding time point as a break intervention time point; and
generate the virtual intervention content to intervene a break of the user.

5. The virtual content providing device of claim 1, wherein the processor is further configured to:
when a response degree of the user is less than a threshold response degree based on the user condition information, determine a corresponding time point as a promotion intervention time point to promote training of the user; and
generate the virtual intervention content for promotion intervention to promote acquisition of skills for the virtual training content.

6. The virtual content providing device of claim 1, wherein the processor is further configured to:
when a difference between a posture of the user and a reference posture is greater than or equal to a first threshold difference and a difference between a movement of the user and a reference movement is greater than or equal to a second threshold difference, based on the user condition information, determine a corresponding time point as a modeling intervention time point; and
generate the virtual intervention content including modeling intervention.

7. The virtual content providing device of claim 1, wherein the processor is further configured to:
when completion of training is confirmed based on the training situation information, determine a corresponding time point as a checkup intervention time point; and
generate the virtual intervention content including checkup intervention.

8. The virtual content providing device of claim 1, further comprising a memory configured to store at least one piece of capability information selected from sensory sensitivity and cognitive ability associated with the user,
wherein the processor is further configured to generate the virtual intervention content to increase training efficiency based on the at least one piece of capability information.

9. The virtual content providing device of claim 8, wherein the processor is further configured to generate the virtual intervention content to stimulate at least one sense having relatively high training efficiency of the user among a plurality of senses including a visual sense, an auditory sense, and a tactile sense based on the at least one piece of capability information.

10. The virtual content providing device of claim 1, wherein the processor is further configured to generate the virtual intervention content corresponding to capability information associated with a general user when the at least one piece of capability information associated with the user is not present in the memory.

11. The virtual content providing device of claim 1, wherein the processor is further configured to:
check the number of times of reproductions of the virtual training content by the user; and
generate the virtual intervention content having a relatively low degree of intervention with respect to the virtual training content as the number of times of reproductions increases.

12. A wearable device comprising:
a display;
an input circuit configured to sense or receive a user input;
a sensor circuit configured to obtain biometric information of a user;
a communication circuit capable of communicating with a virtual content providing device; and
a processor functionally connected to the display, the sensor circuit, and the communication circuit, wherein the processor is configured to:
obtain virtual training content from the virtual content providing device through the communication circuit;
display the obtained virtual training content through the display;
while displaying the virtual training content, generate user condition information associated with the virtual training content based on the biometric information and generate user input information associated with the user input;
transmit the user condition information and the user input information to the virtual content providing device; and
as the virtual content providing device provides virtual intervention content at an intervention time point determined based on the user condition information and the user input information, display the virtual intervention content in synchronization with the virtual training content through the display, wherein the processor is further configured to generate the user condition information comprising a response degree, a fatigue degree, an emotion, a posture, and a movement of the user based on the biometric information.

13. A virtual content providing method, which is performed by a virtual content providing device, the virtual content providing method comprising:
- displaying virtual training content through a wearable device;
- generating training situation information and user condition information associated with the virtual training content through the wearable device, wherein the user condition information comprises a response degree, a fatigue degree, an emotion, a posture, and a movement of the user based on the biometric information;
- determining an intervention time point for the virtual training content based on the training situation information and the user condition information;
- generating virtual intervention content associated with the determined intervention time point; and
- displaying the virtual intervention content in synchronization with the virtual training content through the wearable device.

14. The virtual content providing method of claim 13, wherein the determining of the intervention time point for the virtual training content comprises:
- checking training efficiency of the user for the virtual training content based on the training situation information and the user condition information; and
- determining the intervention time point so that a frequency of intervention increases as the training efficiency decreases.

15. The virtual content providing method of claim 13, wherein the determining comprises,
- when an emotion state of the user is bad, based on the user condition information, determining a corresponding time point as a break intervention time point.

16. The virtual content providing method of claim 13, wherein the determining comprises, when a response degree of the user is less than a threshold response degree based on the user condition information, determining a corresponding time point as a promotion intervention time point to promote training of the user.

17. The virtual content providing method of claim 13, wherein the generating comprises generating the virtual intervention content to increase capability of the user based on at least one piece of capability information selected from sensory sensitivity and cognitive ability associated with the user.

18. The virtual content providing method of claim 13, wherein the generating comprises:
- checking the number of times of reproductions of the virtual training content by the user; and
- generating the virtual intervention content having a relatively low degree of intervention with respect to the virtual training content as the number of times of reproductions increases.

* * * * *